United States Patent
Kaiaboukis et al.

(10) Patent No.: US 8,914,342 B2
(45) Date of Patent: Dec. 16, 2014

(54) PERSONAL DATA PLATFORM

(75) Inventors: Chris Kalaboukis, San Jose, CA (US);
Christopher William Higgins, Portland, OR (US); Marc Eliot Davis, San Francisco, CA (US); Ronald Martinez, San Francisco, CA (US); Rahul Nair, Sunnyvale, CA (US); Simon P. King, Berkeley, CA (US); Carrie Burgener, Mountain View, CA (US); Duane R. Valz, Emeryville, CA (US)

(73) Assignee: Yahoo! Inc., Sunnyvale, CA (US)

( * ) Notice: Subject to any disclaimer, the term of this patent is extended or adjusted under 35 U.S.C. 154(b) by 352 days.

(21) Appl. No.: 12/540,269

(22) Filed: Aug. 12, 2009

(65) Prior Publication Data
US 2011/0040736 A1    Feb. 17, 2011

(51) Int. Cl.
G06F 17/00    (2006.01)
G06F 17/30    (2006.01)
H04L 29/06    (2006.01)
G06F 21/62    (2013.01)

(52) U.S. Cl.
CPC ........ G06F 21/6245 (2013.01); G06F 21/6254 (2013.01)
USPC ................ 707/694; 707/737; 707/754; 726/1

(58) Field of Classification Search
USPC ............. 707/737, 754, 755, 999.01, 999.101, 707/999.102, 732–734, 694, 707, 738; 726/1
See application file for complete search history.

(56) References Cited

U.S. PATENT DOCUMENTS

| | | | |
|---|---|---|---|
| 5,446,891 | A | 8/1995 | Kaplan et al. |
| 5,493,692 | A | 2/1996 | Theimer et al. |
| 5,583,763 | A | 12/1996 | Atcheson et al. |
| 5,651,068 | A | 7/1997 | Klemba et al. |
| 5,761,662 | A | 6/1998 | Dasan |
| 5,764,906 | A | 6/1998 | Edelstein et al. |
| 5,781,879 | A | 7/1998 | Arnold et al. |
| 5,784,365 | A | 7/1998 | Ikeda |
| 5,794,210 | A | 8/1998 | Goldhaber et al. |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

U.S. Appl. No. 12/241,590, filed Sep. 30, 2008, Athsani.

(Continued)

*Primary Examiner* — Marc Filipczyk
(74) *Attorney, Agent, or Firm* — James J. DeCarlo; Greenberg Traurig, LLP

(57) ABSTRACT

Receive a plurality of data management policies from a user. Store in a memory the data management policies in association with a context and an identifier of the user. Receive personal data of the user collected in one or more contexts by one or more collection devices. Determine whether the personal data complies with one or more of the data management policies with respect to collecting personal data of the user. If the personal data complies with the data management policies with respect to collecting personal data on the user, then storing in the memory the personal data in association with the identifier of the user. Provide a centralized interface to the user for managing the personal data stored in the memory.

15 Claims, 5 Drawing Sheets

(56) References Cited

U.S. PATENT DOCUMENTS

| | | |
|---|---|---|
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Ramer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,681,203 B2* | 3/2010 | Mandato et al. ............... 719/316 |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman |
| 7,783,622 B1 | 8/2010 | Vandermolen et al. |
| 7,792,040 B2 | 9/2010 | Nair |
| 7,797,196 B1* | 9/2010 | Aaron et al. ................. 705/26.1 |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 8,799,242 B2* | 8/2014 | Leonard et al. ............... 707/694 |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |

(56) References Cited

U.S. PATENT DOCUMENTS

| | | |
|---|---|---|
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Simon et al. |
| 2007/0239348 A1 | 10/2007 | Cheung |
| 2007/0239517 A1 | 10/2007 | Chung et al. |
| 2007/0244932 A1* | 10/2007 | Ahn et al. .................... 707/200 |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |

(56) References Cited

U.S. PATENT DOCUMENTS

| | | | |
|---|---|---|---|
| 2008/0133750 A1 | 6/2008 | Grabarnik et al. | |
| 2008/0147655 A1 | 6/2008 | Sinha et al. | |
| 2008/0147743 A1 | 6/2008 | Taylor et al. | |
| 2008/0148175 A1 | 6/2008 | Naaman et al. | |
| 2008/0154720 A1 | 6/2008 | Gounares | |
| 2008/0163284 A1 | 7/2008 | Martinez et al. | |
| 2008/0172632 A1 | 7/2008 | Stambaugh | |
| 2008/0177706 A1 | 7/2008 | Yuen | |
| 2008/0194233 A1* | 8/2008 | Henry | 455/411 |
| 2008/0195495 A1* | 8/2008 | Rubin et al. | 705/14 |
| 2008/0270579 A1 | 10/2008 | Herz et al. | |
| 2008/0281974 A1* | 11/2008 | Slothouber et al. | 709/229 |
| 2008/0285886 A1 | 11/2008 | Allen | |
| 2008/0301250 A1 | 12/2008 | Hardy et al. | |
| 2008/0320001 A1 | 12/2008 | Gaddam | |
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/041,088, filed Mar. 3, 2008, Higgins.
U.S. Appl. No. 12/015,146, filed Jan. 16, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).

(56) References Cited

OTHER PUBLICATIONS

Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.Tv and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, Number: 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags."Proceedings of DARE 2000 on Designing augmented reality environments, Elsinore, Denmark, pp. 1-11 Apr. 12-14, 2000.
"Semacode—URL Barcodes—practical ubiquitous computing", located at http://semacode.org visited on Apr. 13, 2007; 3 pages.
"Technical White Paper: Choosing the best 2D barcoade format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.

Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification."10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu.acil/Personal_sites/tarnirtassa/Publications/hcm.pdf+goldberger+clustering+method+hungarian> visited on Mar., 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and Odbase R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
O'Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.
"Digital rights management: a primer: developing a user-friendly means of protecting content.(Profile)", Screen Digest, No. 420, p. 305, Sep. 2006, (pp. 1-9 of attached).
Nedos, A; Singh K., Clarke S, Proximity Based Group Communications for Mobile Ad Hoc Networks, Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-2-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated April 30, 2010; 12 pages.

(56) References Cited

OTHER PUBLICATIONS

International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >. . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "Stalk. The Camera-phone Scavenger Hunt!" located at <http://www.stalk.com >, last visited on Dec. 28, 2009, two pages.
www.stalk.com (retrieved on Dec. 29, 2009) pages 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.

(56) References Cited

OTHER PUBLICATIONS

U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Davis et al., "From Context to Content: Leveraging Context for Mobile Media Metadata", Second International Conference on Mobile Systems Applications and Services, 2004, 7 pgs.
"Google Earth User Guide", published 2007, 131 pgs. <<http://static.googleusercontent.com/external_content/untrusted_dlcp/earth.google.com/en/us/userguide/v4/google_earth_user_guide.pdf>>.

* cited by examiner

PERSONAL DATA PLATFORM

TECHNICAL FIELD

The present disclosure generally relates to data management and more specifically relates to centralized personal data management.

BACKGROUND

Computer and communications technologies have contributed significantly to the arrival of the Information Age. Massive amounts of data are continuously generated by and about electronic device users, and a percentage of the generated data is collected, processed, analyzed, exchanged, and utilized. Consequently, there is continuous effort to improve on the data management technologies, especially on the management of large quantities of data.

SUMMARY

The present disclosure generally relates to data management.

In disclosed embodiments, a method of personal data management includes receiving a plurality of data management policies from a user and storing, in a memory, the data management policies in association with a context and an identifier of the user. The method also can include receiving personal data of the user collected in one or more contexts by one or more collection devices, determining whether the personal data complies with one or more of the data management policies with respect to collecting personal data of the user, and, if the personal data complies with the data management policies with respect to collecting personal data on the user, then storing in the memory the personal data in association with the identifier of the user. The method also can include providing a centralized interface to the user for managing the personal data stored in the memory.

DETAILED DESCRIPTION

Figure 1A:
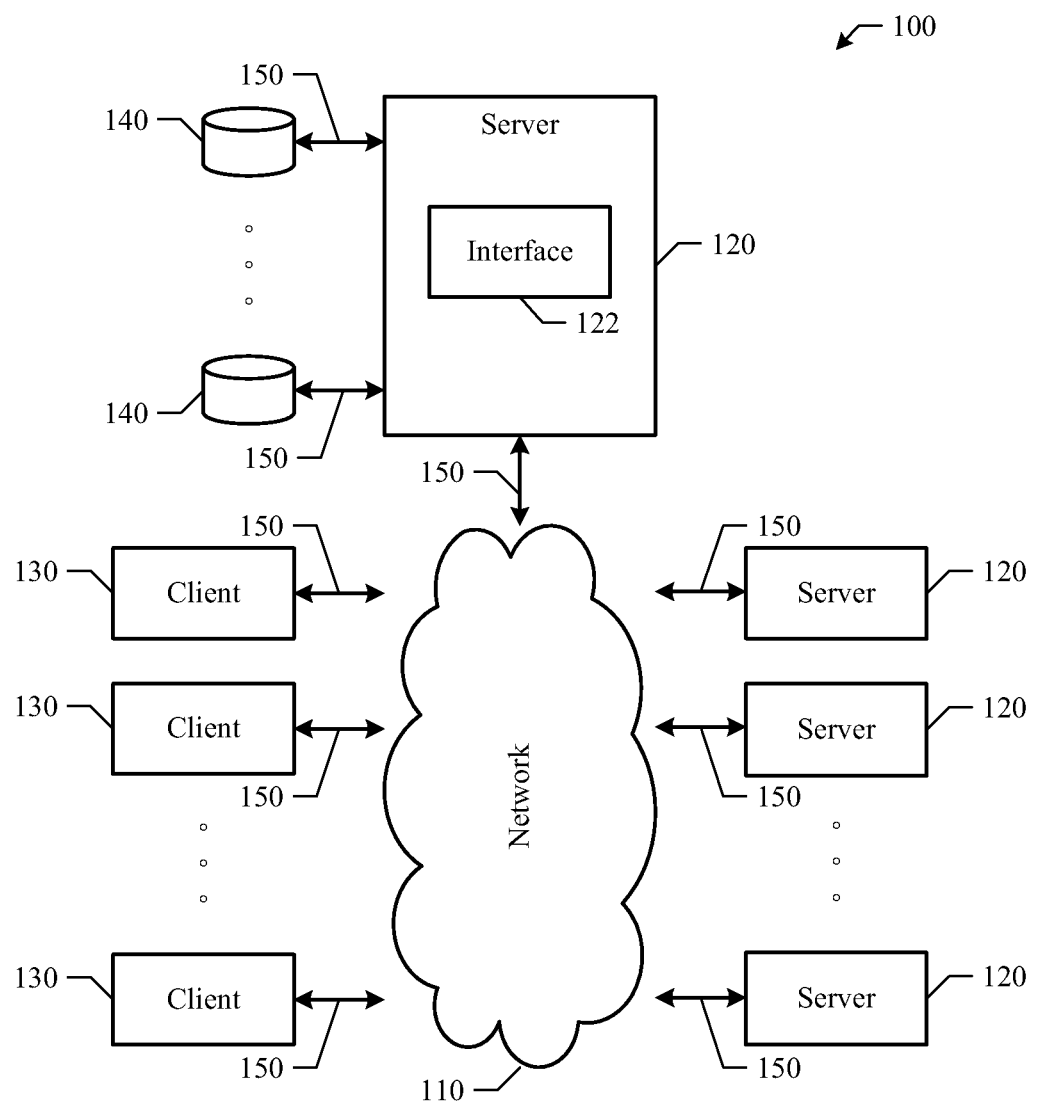
FIG. 1A illustrates an example network environment.

The present disclosure is now described in detail with reference to a few example embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order to not unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In the current Information Age, massive amounts of data are continuously generated. Data is, for example and without limitation, information by, about, or on behalf of users, entities, groups, physical objects, vehicles, appliances, sensors, information objects, topics, subjects, times, time periods or durations, events, places, businesses, or buildings. Data may come from a variety of sources, including, for example and without limitation, any real-world or online sources capable of producing and publishing or sharing data. Data is information, and information is data. Such data may come from both public and private sources, and each is capable of generating personal data. Personal data, such as data generated directly or indirectly by individuals such as their activities and associations, may be generated both online and offline as the individual conducts their daily activities. For example and without limitation, when a person becomes a registered user of a website, as a part of the registration process, he may provide the website his demographic data, such as age, gender, ethnicity, residential address, work address, telephone numbers, email address, marital status, family status, education level, profession, annual income, hobbies, interests, etc. When a person meets a new friend or acquaintance, he may store the contact data of the new friend or acquaintance in his communications device. When a person contacts a friend via a mobile telephone, electronic mail (E-mail), or instant message (IM), the communications device or application may record the name and contact data of the friend and the time and length of the communication as well as the content of the communication in some instances. When a person visits various websites, the servers hosting the websites may record the time he visits each of the websites and the actions taken by him at each of the website just as an association with the user is created when they publish online content, publications, annotations or comments left by users including text, audio, image and video media objects. When a person visits a physical location, the navigation system in his vehicle or his mobile telephone may record the physical location he visits and the time of the visit as well as the patterns of movement of the user over time through space and time including co-location information with other user, vehicles, devices or other sensors.

Personal data generated by the individuals may be used in many different ways by many different parties, stored in different locations and in differing formats. For example and without limitation, businesses often utilize an individual's personal data to help deliver personalized services to the individual, such as providing personalized recommendations on services or products based on the individual's disclosed hobbies and interests or the individual's past purchases or online search or browsing behavior. Social network services sometimes help individuals establish social connections to friends, families, coworkers, and other acquaintances and can filter or preference recommendation of new friendships or associations as sources of potential personal data.

Although personal data may provide many benefits to both the individuals generating the data and the third parties servicing the individuals, currently there is no efficient and effective way to enable the individuals to manage their personal data conveniently and through a single interface, capturing as much, if not all, of the user's personal data into one virtual place accessible through many means and potential interfaces such as mobile or personal computing devices. Various pieces of personal data with respect to an individual are collected, stored, and processed by different parties located at different sites, often in an ad hoc manner. The parties rarely share the different pieces of data collected on the same individual, and there is no centralized location from where an individual may manage all of his personal data collected by the different parties. Furthermore, a great amount of personal data is lost due to the deficiencies in the way such data is captured. For example, each time a person becomes a registered user of a different website, he needs to provide his demographic data to the website again. If a person visits different websites, each website only collects and stores data on the actions he takes at the particular website, and the actions he takes at one website is usually not known to, i.e., shared with, the other websites. If a person calls a friend on his mobile telephone, data on the telephone call is only available on his mobile telephone. If the person does not manually store the data, the data is often lost.

To address some of these problems, particular embodiments provide a policy-based system that enables a person to manage the retention, processing, and usage of his personal data via a centralized interface and any collection device or context-specific policy implementation means, e.g., a mobile phone application or web browser plug in, data-sharing agreement with credit card companies, etc. A person may define a set of policies, contexts, and means that govern the monitoring, collecting, aggregating, filtering, processing, storing, publishing, and sharing of his personal data. In addition, a centralized interface is provided that enables the user to monitor data events and trends including the ability to edit the policies and contexts as well as any previously collected personal data. A user thus has complete control over his personal data.

Computer and communications technologies enable individuals to transfer data conveniently, freely, and often with insignificant or short delays. For example and without limitation, wired and wireless client devices connected to the various types of networks enable individuals to access and exchange data. FIG. 1A illustrates an example network environment 100 via which personal data may be collected, exchanged, and shared. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 110 or a combination of two or more such networks 110. The present disclosure contemplates any suitable network 110.

One or more links 150 couple servers 120 or clients 130 to network 110. In particular embodiments, one or more links 150 each includes one or more wired, wireless, or optical links 150. In particular embodiments, one or more links 150 each includes an intranet, an extranet, a VPN, a LAN, a WLAN, a WAN, a MAN, a communications network, a satellite network, a portion of the Internet, or another link 150 or a combination of two or more such links 150. The present disclosure contemplates any suitable links 150 coupling servers 120 and clients 130 to network 110.

In particular embodiments, each server 120 may be a unitary server or may be a distributed server spanning multiple computers or multiple datacenters. Servers 120 may be of various types, such as, for example and without limitation, web server, news server, mail server, message server, advertising server, file server, application server, exchange server, database server, or proxy server. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores.

In particular embodiments, a client 130 may be an electronic device including hardware, software, or embedded logic components or a combination of two or more such components and capable of carrying out the appropriate functionalities implemented or supported by client 130. For example and without limitation, a client 130 may be a desktop computer system, a notebook computer system, a netbook computer system, a handheld electronic device, or a mobile telephone. A client 130 may enable an Internet user at client 130 to access network 110. A client 130 may have a web browser, such as Microsoft Internet Explore, or Mozilla Firefox, and may have one or more add-ons, plug-ins, or other extensions, such as Google Toolbar or Yahoo Toolbar. A client 130 may enable its user to communicate with other users at other clients 130. The present disclosure contemplates any suitable clients 130.

In particular embodiments, one or more data storages 140 may be communicatively linked to sever 120 via a link 150. In particular embodiments, data storage 140 may be used to store user profiles, user data policies and contexts, user personal data, or other suitable data. In particular embodiments, server 120 may implement one or more interfaces 122 that provide access to the data stored in data storage 140. For example and without limitation, the interface may enable server 120 to retrieve the data stored in data storage 140, client 130 to add data to, delete data from, or modify data stored in data storage 140, or a user at client 130 to manage his personal data, profile, or data policies stored in data storage 140. Particular embodiments may implement interface 122 as software programs. For example and without limitation, interface 122 may be application programming interface (API), one or more desktop applications, or one or more web or mobile applications, plug-ins, modules, widgets, toolbars or other form of independent or add-on personal data management interface.

In particular embodiments, client 130 may implement one or more software applications such as desktop applications, mobile applications, or web applications. The software applications may monitor and collect personal data generated by a user at client 130 and transmit the collected personal data to server 120 to be stored in one or more data storages 140. The software applications may provide a user interface that enables a user at client 130 to manage his collected personal data or data policies.

Figure 1B:
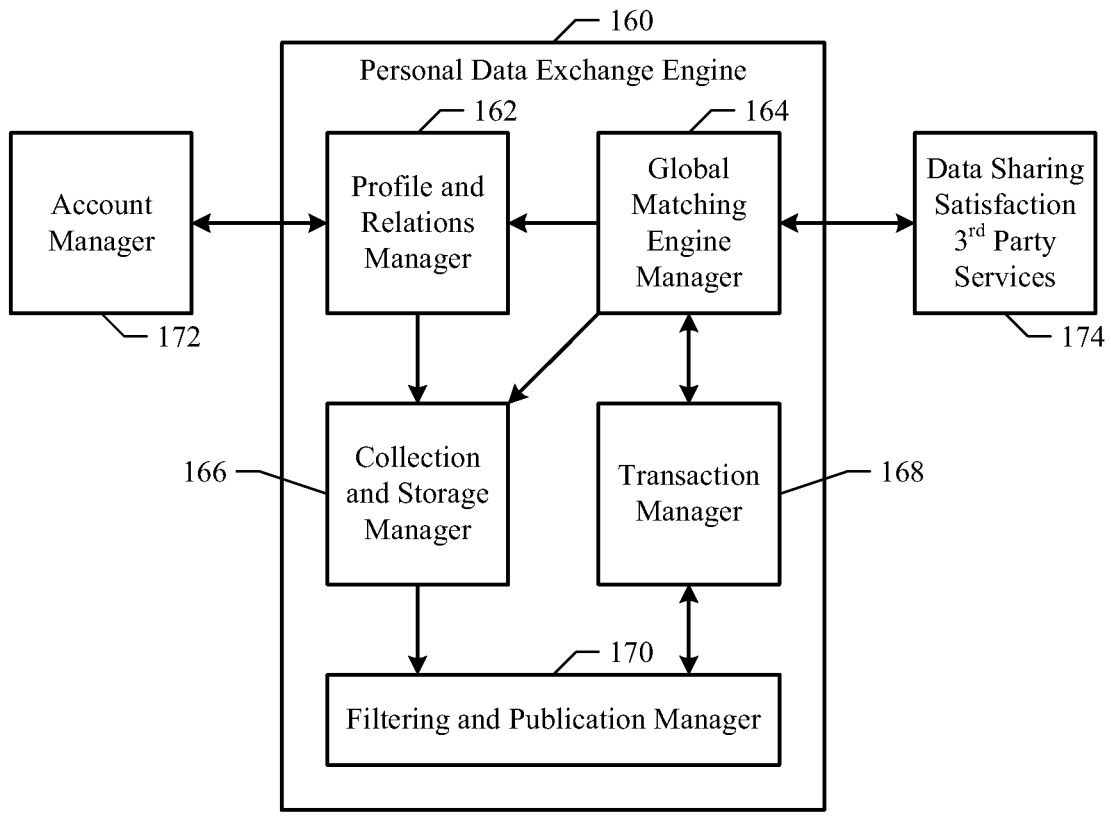
FIG. 1B illustrates an example system for managing personal data.

FIG. 1B illustrates an example system for managing personal data. The system includes a personal data exchange engine 160. Particular embodiments may implement personal data exchange engine 160 as hardware, software or a combination of hardware and software. In particular embodiments, personal data exchange engine 160 may be implemented on one or more servers 120. In particular embodiments, personal data exchange engine 160 may include one or more modules, and each module may implement specific functionalities. For example, personal data exchange engine 160 may include a profile and relations manager 162, a global matching engine manager 164, a collection and storage manager 166, a transaction manager 168, and a filtering and publication manager 170. In addition, the system may also include an account manager 172 and a data sharing and third party services module 174 that may be implemented on one or more servers 120 or clients 130. The specific functionalities of these modules are described in more detail below in connection with selected steps illustrated in FIG. 2.

Figure 2:
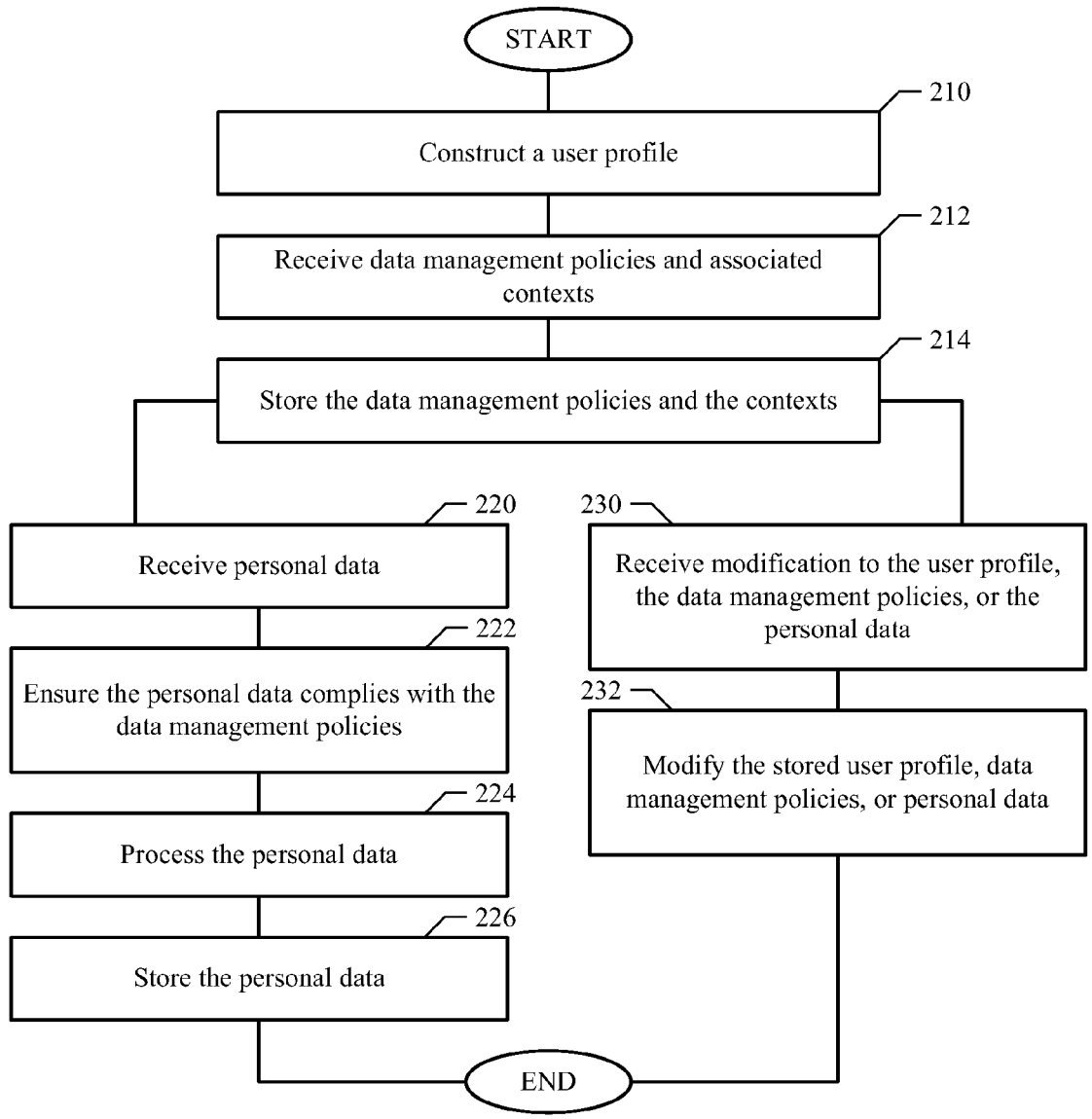
FIG. 2 illustrates an example method for managing personal data, which may be suitable for execution on a server.

FIG. 2 illustrates an example method for managing personal data. Particular embodiments consider any data on a user or generated directly or indirectly by the user as the user's personal data. The steps illustrated in FIG. 2 may be implemented as computer software and executed on server 120. In particular embodiments, when a person wishes to have his personal data retained and managed, he may subscribe to a personal data management service. To do so, in particular embodiments, the person may register with the personal data management service to become a registered user of the service. Once the person becomes a registered user, a user profile may be constructed for the person (step 210). The user profile may include data and data policies unique to the user. In this context, a "user" could also be a collection of two or more users such as a couple, a family, an organization or business, an association, or otherwise interconnected set of users, and in these embodiments the user profile is the aggregated profile of all included users. For example and without limitation, the user profile may include the user's username and password, with which the user may access his account data and data policies. In addition, the user profile may include the user's demographic data, communication data, presence data, and transaction data. If the personal data management service is a paid service, the user profile may include the user's payment method, such as the user's credit card number or bank account number. The user profile may also include unique tokens assigned to the user that may be used in connection with implementing various functionalities provided by the personal data management service.

In particular embodiments, the user profiles of all the registered users may be stored in one or more data storages 140 communicatively linked to and accessible by personal data exchange engine 160 residing on one or more servers 120. In particular embodiments, profile and relations manager 162 may manage the user profiles. The individual users may access their own user profiles via account manager 172 residing on their client devices such as clients 130. Account manager 172 may in turn communicate with profile and relations manager 162 on behalf of the individual users.

The user may provide the personal data management service his data management policies that govern how his personal data is to be managed in all or varying contexts (step 212). A context may represent a particular situation. A user may specify any number of contexts representing a variety of different situations. The user's data management policies may each apply to individual contexts or to all contexts. For example and without limitation, the user's data management policies may indicate the type of personal data to be collected or not to be collected, the time for collecting the data, the device used to collect the data, the processes applied to the collected data such as aggregation, filtering, characterization, linking, or encryption, what data may be published, what data may be shared with specific parties, etc. In particular embodiments, the personal data management service may also have a set of default policies. The user may choose to use none, some, or all of the default policies and may provide his own data management policies in addition or in place of the default policies or may modify the default policies to suit his needs.

With respect to applying data management policies to contexts, for example, one policy may indicate not to accept any telephone calls from a particular person under all circumstances, i.e., applying to all contexts, or another policy may indicate not to accept any telephone calls from a particular person only when the user is at work, i.e., applying to a specific context.

In particular embodiments, the user's data management policies may be stored in data storage 140 communicatively linked to and accessible by personal data exchange engine 160 residing on one or more servers 120 (step 214). For example, the user's data management policies may be stored together with the user's user profile, and both may be uniquely identified with the user's username or a unique token or other identifier assigned to the user. Profile and relations manager 162 may also manage the data management policies of all registered users, and the individual users may access their data management policies using account manager 172 residing on their client devices such as client 130.

When the personal data management service receives the user's personal data, e.g., from a client 130 associated with the user such as a mobile personal device or from a client 130 not associated with the user such as an environmental sensor that has collected the personal data (step 220), the personal data management service ensures that the received personal data complies with the user's data management policies (step 222). For example, the personal data management service may determine that the received personal data is indeed the type of data that should be collected according to the specific data collection policies included in the user's data management policies. In particular embodiments, the received personal data may include the user's login or user name or the unique token or other identifier assigned to the user so that the personal data management service may be able to determine to which user the personal data belongs. Ensuring that the collected personal data complies with a user's data management policies may be done either on a server 120, e.g., by collection and storage manager 166, or on a client 130, e.g., by the client responsible for collecting the personal data.

If the received personal data should not have been collected, e.g., the received personal data is not the type that should be collected according to the user's data collection policies, the personal data management service may discard the received personal data, filter the data, blur the data, or otherwise modify the data. On the other hand, if the received personal data complies with the user's data management policies, the personal data management service may further process the received personal data based on the specific data process policies included in the user's data management policies (step 224). For example and without limitation, the personal data may be aggregated, filtered, summarized, characterized, modified by a data model, linked to or from, published, stored, shared, etc. There may be a combination of default categories and user defined categories. If the received personal data is relating to a purchase the user has recently made at a website, it may be categorized to an "Online Commerce Transactions" category and used for future personalization of search results based upon purchases as well as automatically shared with an intimate set of friends as a product recommendation. If the received personal data is relating to an E-mail sent to a friend, it may be categorized to a "Social Networks" category. In particular embodiments, the personal data may be arranged according to specific data structure such as in a hierarchy for easy access and retrieval. For example, there may be data categories and within each category there may be subcategories, such as within the Social Networks category, there may be "Families", "Friends", "Colleagues", "Casual Acquaintances" subcategories as well as attribute-defined groups or categories, e.g. friends with whom I have seen a concert. In particular embodiments, the various functionalities that process the collected personal data may be performed by various components of personal data exchange engine 160, e.g., transaction manager 168 or filtering and publication manager 170.

In particular embodiments, to protect user privacy, the user may specify data privacy policies to encrypt or anonymize his personal data. Particular embodiments may use existing encryption or anonymization techniques. For example and without limitation, each user and his profile, data management policies, and personal data may be identified using a unique random token that bears no relationship to the user's real identity.

In particular embodiments, the user may specify data exchange policies. Sometimes, the user may wish to automatically share certain types of data with specific third parties. For example, the user may specify a policy to automatically inform his wife of his physical location data between 8:00 pm and 8:00 am. When the personal data management service receives data on the user's physical location between 8:00 pm and 8:00 am, based on the particular policy, the personal data management service may send an E-mail to an E-mail address provided by the user, e.g., the E-mail address of the user's wife, with the user's physical location data. Conversely, to protect his data, the user may also specify a policy indicating the type of data not to be shared with anyone or with specific parties. In particular embodiments, data sharing satisfaction and third party services module 174 may perform some or all of the functionalities relating to sharing a user's personal data with specific third parties.

In particular embodiments, the user may specify that one or more data models are to be applied to specific pieces of his personal data through one or more data management policies. For example and without limitation, certain types of data may be more important to the user than others and thus may be processed differently. From the user's social network data, the user may specify one or more individuals as his closest friends. Data on communications with these close friends may be processed differently, e.g., having higher priority or stronger privacy protection, than communications with other individuals.

The personal data, once processed, may be stored in data storage 140 communicatively linked to and accessible by server 120 (step 226). The user's personal data may be uniquely identified with the user's username or a unique token assigned to the user. Particular embodiments may store the personal data in its raw data format or in a processed format or both. In particular embodiments, data storage 140 may implement a database, such as a relational database.

In particular embodiments, the user may modify his user profile, data management policies, or personal data at any time, e.g., via account manager 172. The user may access his account via an interface provided by the personal data management service. For example and without limitation, the interface may be implemented as a web application that may be executed in a browser, mobile application or as a desktop application. The user may verify his identity with the personal data management service by logging into his account using his username and password. Once logged in, the user may update his profile, add new data management policies, delete or modify existing data management policies, review personal data, modify or delete specific pieces of personal data via the interface, publish specific pieces of personal data, or share specific pieces of personal data with specific third parties.

When the personal data management service receives a user modification to his user profile, data management policies, or personal data (step 230), the personal data management service modifies the appropriate data stored in data storage 140 accordingly (step 232). In particular embodiments, profile and relations manager 162 may perform some or all of the functionalities relating to managing users' profile, data management policies, and personal data.

Steps 220-226 may be repeated as often as necessary, such as each time new personal data is received. Similarly, steps 230-232 may be repeated as often as necessary, such as each time the user wishes to review or modify his data.

In particular embodiments, the interface provides the user with a centralized access point through which the user may manage all of his personal data, regardless of from where and how his personal data is generated, where his personal data is stored, who and what collects his personal data, or when his personal data is collected. Further more, the data management policies ensure that the user's personal data is processed, handled, and used exactly as the user specifies, thus giving the user complete control of his personal data. For example, the user may have both a Yahoo and a Google membership, using each to search sometimes and yet the present invention enables the user to store data generated on both sites into one unified data repository, virtual or actual that is available to further increase personalization.

Figure 3:
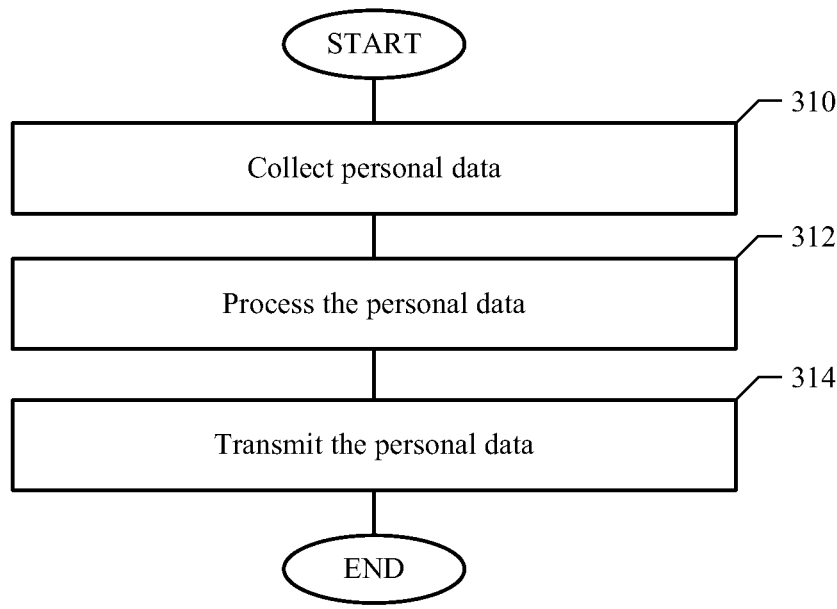
FIG. 3 illustrates an example method for managing personal data, which may be suitable for execution on a collection device.

FIG. 3 illustrates an example method for managing personal data. The steps illustrated in FIG. 3 may be implemented as computer software and executed on a collection device, e.g., client 130. In particular embodiments, when a user registers with the personal data management service, the user may download and install the computer software to client 130. The computer software may function as an agent for the user to continuously monitor and collection personal data and transmit the collected personal data to personal data exchange engine 160 implemented on one or more servers 120. Subsequently, when newer versions of the computer software become available, the copy of the computer software installed on client 130 may be automatically or manually updated. If the user has multiple clients 130, the user may download and install a copy of the computer software to each of his clients 130 so that the user may use the personal data management service via different clients 130 as well as various network operators with client 130 sensors or server 120 personal data sources.

In particular embodiments, the computer software runs continuously, beginning immediately upon user registration and uploading of actual or default personal data polices and is present in every context and on every personal user device thereafter.

In other embodiments, the computer software may be executed automatically when client 130 is turned on and may run in the background so as not to interfere with the user's usage of client 130. The user's personal data may be continuously collected (step 310), immediately processed according to the appropriate user personal data polices (step 312), and transmitted to personal data exchange engine 160 at appropriate server 120 (step 314). In particular embodiments, the collected personal data may be temporarily stored on client 130. For example, if the user makes a telephone call using his mobile telephone, the computer software may collect data on the telephone call. However, it may not be desirable to transmit the collected personal data during the telephone call as the transmission may interfere with the telephone call. In this case, the collected personal data on the telephone call may be temporarily stored on the mobile telephone and transmitted to server 120 after the user has completed the telephone call, e.g., when the mobile telephone is in an idle state. Sometimes, client 130 may be temporarily disconnected from network 110. In this case, the personal data collected by client 130 may be temporarily stored locally on client 130 and transmitted to server 120 after client 130 is reconnected to network 110. In particular embodiments, the collected personal data may be processed on client 130 (step 312) before it is transmitted to personal data exchange engine 160. For example, the data that does not comply with the user's data management policies may be discarded by client 130 without ever being transmitted to personal data exchange engine 160.

The user's personal data, once collected, may be used in many different ways by the user himself or by authorized third parties. The user may review his past activities, e.g., what he has purchased, which websites he has visited, what friends he has contacted, etc. The user may provide certain pieces of his personal data to trusted third parties so that the third parties may provide him with personalized services. The user may direct the personal data management service to forward his past online purchases from all websites to a particular business so that the business may have more comprehensive data about the user's purchasing activities for the purpose of providing personalized services. One or more third parties may also request some or all of the user's personal data stored in data storage 140. Upon receiving such a request from a third party, the personal data management service may verify the request against the user's data management policies with respect to sharing his personal data. If the user's data management policies indicate that the third party is authorized to access the requested personal data, the personal data management service may transmit the requested personal data to the third party. Otherwise, the personal data management service may deny the third party's request.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 4:
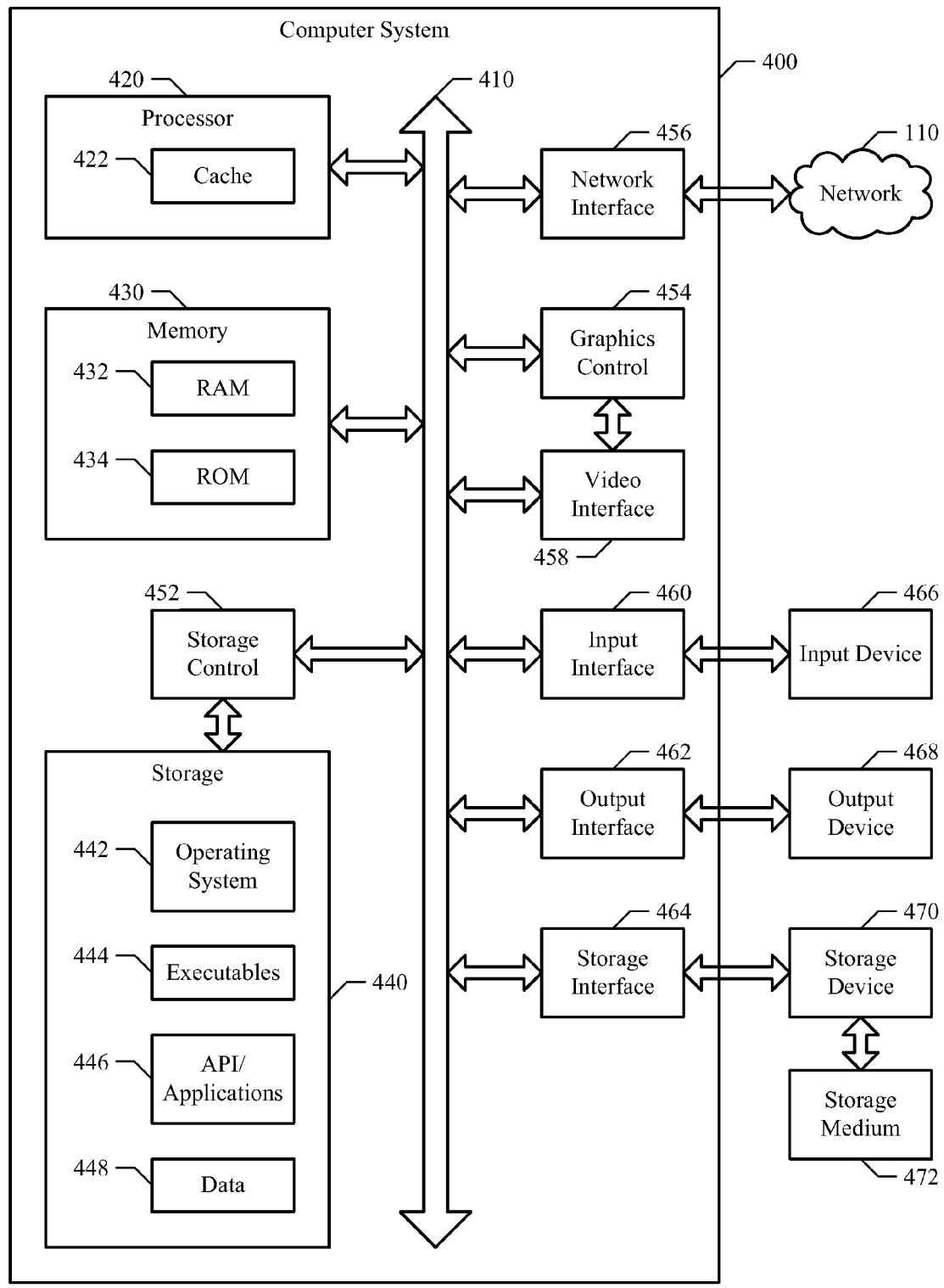
FIG. 4 illustrates an example computer system.

For example, FIG. 4 illustrates an example computer system 400 suitable for implementing one or more portions of particular embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, or one or more super computers.

Computer system 400 may have one or more input devices 466 (which may include a keypad, keyboard, mouse, stylus, etc.), one or more output devices 468 (which may include one or more displays, one or more speakers, one or more printers, etc.), one or more storage devices 470, and one or more storage medium 472. An input device 466 may be external or internal to computer system 400. An output device 468 may be external or internal to computer system 400. A storage device 470 may be external or internal to computer system 400. A storage medium 472 may be external or internal to computer system 400.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 420 (or central processing units (CPUs)). A processor 420 may contain a cache 422 for temporary local storage of instructions, data, or computer addresses. Processors 420 are coupled to one or more storage devices, including memory 430. Memory 430 may include random access memory (RAM) 432 and read-only memory (ROM) 434. Data and instructions may transfer bidirectionally between processors 420 and RAM 432. Data and instructions may transfer unidirectionally to processors 420 from ROM 434. RAM 432 and ROM 434 may include any suitable computer-readable storage media.

Computer system 400 includes fixed storage 440 coupled bidirectionally to processors 420. Fixed storage 440 may be coupled to processors 420 via storage control unit 452. Fixed storage 440 may provide additional data storage capacity and may include any suitable computer-readable storage media. Fixed storage 440 may store an operating system (OS) 442, one or more executables 444, one or more applications or programs 446, data 448, and the like. Fixed storage 440 is typically a secondary storage medium (such as a hard disk) that is slower than primary storage. In appropriate cases, the data stored by fixed storage 440 may be incorporated as virtual memory into memory 430.

Processors 420 may be coupled to a variety of interfaces, such as, for example, graphics control 454, video interface 458, input interface 460, output interface 462, and storage interface 464, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 456 may couple processors 420 to another computer system or to network 110. With network interface 456, processors 420 may receive or send data from or to network 110 in the course of performing steps of particular embodiments. Particular embodiments may execute solely on processors 420. Particular embodiments may execute on processors 420 and on one or more remote processors operating together.

In a network environment, where computer system 400 is connected to network 110, computer system 400 may communicate with other devices connected to network 110. Computer system 400 may communicate with network 110 via network interface 456. For example, computer system 400 may receive data (such as a request or a response from another device) from network 110 in the form of one or more incoming packets at network interface 456 and memory 430 may store the incoming packets for subsequent processing. Computer system 400 may send data (such as a request or a response to another device) to network 110 in the form of one or more outgoing packets from network interface 456, which memory 430 may store prior to being sent. Processors 420 may access an incoming or outgoing packet in memory 430 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 430 may include one or more computer-readable storage media embodying software and computer system 400 may provide particular functionality described or illustrated herein as a result of processors 420 executing the software. Memory 430 may store and processors 420 may execute the software. Memory 430 may read the software from the computer-readable storage media in mass storage device 430 embodying the software or from one or more other sources via network interface 456. When executing the software, processors 420 may perform one or more steps of one or more processes described or illustrated herein, which may include defining one or more data structures for storage in memory 430 and modifying one or more of the data structures as directed by one or more portions the software, according to particular needs. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
  receiving, from a user by a processor, a plurality of personal data management policies for the user that are unique to the user, the personal data management policies governing how personal data of the user is to be managed, the personal data management policies indicating a type of personal data to be collected, storing of the personal data, and sharing of the personal data;
  storing in a memory, by the processor, the personal data management policies in association with a situation and an identifier of the user;

receiving, by the processor, from the user a modification to the data management policies stored in the memory;

updating, by the processor, the data management policies stored in the memory based on the modification;

constructing, by the processor, a user profile for the user;

storing in the memory, by the processor, the user profile in association with the identifier of the user;

receiving, by the processor, personal data of the user collected in one or more situations by one or more collection devices;

determining, by the processor, whether the personal data complies with one or more of the personal data management policies;

if the personal data complies with the personal data management policies, then storing in the memory, by the processor, the personal data in association with the identifier of the user and the policy indicating the storing of the personal data;

processing, by the processor the personal data according to one or more of the data management policies with respect to processing personal data of the user in a specific situation;

the processing of the personal data comprises:
   aggregating the personal data according to one or more of the personal data management policies,
   filtering the personal data according to one or more of the personal data management policies,
   characterizing the personal data according to one or more of the personal data management policies,
   applying one or more data models to the personal data according to one or more of the personal data management policies, and
   sharing the personal data with one or more third parties according to one or more of the personal data management policies; and providing, by the processor, a centralized interface to the user for managing the personal data stored in the memory.

2. The method recited in claim 1, further comprising:
   receiving, by the processor, a modification to the personal data stored in the memory from the user; and
   updating, by the processor, the personal data stored in the memory based on the modification.

3. The method recited in claim 1, further comprising:
   receiving, by the processor, from the user a modification to the user profile stored in the memory; and
   updating, by the processor, the user profile stored in the memory based on the modification.

4. The method recited in claim 1, wherein the personal data of the user is collected by an agent residing on the collection devices.

5. The method recited in claim 1, wherein the personal data of the user comprises personal data generated by or concerning the user.

6. A system comprising:
   a processor;
   a storage medium for tangibly storing thereon program logic for execution by the processor, the program logic comprising:
      first receiving logic executed by the processor for receiving, from a user, a plurality of personal data management policies for the user that are unique to the user, the personal data management policies governing how personal data of the user is to be managed, the personal data management policies indicating a type of personal data to be collected, storing of the personal data, and sharing of the personal data;
      first storing logic executed by the processor for storing in the storage medium the personal data management policies in association with a situation and an identifier of the user;
      user profile constructing logic executed by the processor for constructing a user profile for the user;
      user profile storing logic executed by the processor for storing in the storage medium the user profile in association with the identifier of the user;
      modification receiving logic executed by the processor for receiving, from the user, a modification to the data management policies stored in the storage medium;
      updating logic executed by the processor for updating the data management policies stored in the storage medium based on the modification;
      second receiving logic executed by the processor for receiving personal data of the user collected in one or more situations by one or more collection devices;
      determining logic executed by the processor for determining whether the personal data complies with one or more of the personal data management policies;
      second storing logic executed by the processor for, if the personal data complies with the personal data management policies, storing in the storage medium the personal data in association with the identifier of the user and the policy indicating the storing of the personal data;
      processing logic executed by the processor for processing the personal data according to one or more of the personal data management policies with respect to processing personal data of the user in a specific situation;
      the processing logic to process the personal data comprises logic to:
         aggregate the personal data according to one or more of the personal data management policies,
         filter the personal data according to one or more of the personal data management policies,
         characterize the personal data according to one or more of the personal data management policies,
         apply one or more data models to the personal data according to one or more of the personal data management policies,
         share the personal data with one or more third parties according to one or more of the personal data management policies; and
      providing logic executed by the processor for providing a centralized interface to the user for managing the personal data stored in the storage medium.

7. The system recited in claim 6, wherein the program logic further comprises:
   third receiving logic executed by the processor for receiving a modification to the personal data stored in the storage medium from the user; and
   updating logic executed by the processor for updating the personal data stored in the storage medium based on the modification.

8. The system recited in claim 6, wherein the program logic further comprises:
   third receiving logic executed by the processor for receiving from the user a modification to the user profile stored in the storage medium; and
   updating logic executed by the processor for updating the user profile stored in the storage medium based on the modification.

9. The system recited in claim 6, wherein the personal data of the user is collected by an agent residing on the collection devices.

10. The system recited in claim 6, wherein the personal data of the user comprises personal data generated by or concerning the user.

11. A non-transitory computer-readable storage medium tangibly storing computer program instructions capable of being executed by a computer processor, the computer program instructions defining the steps of:
receive, from a user by the processor, a plurality of personal data management policies for the user that are unique to the user, the personal data management policies governing how personal data of the user is to be managed, the personal data management policies indicating a type of personal data to be collected, storing of the personal data, and sharing of the personal data;
store in a memory by the processor the personal data management policies in association with a situation and an identifier of the user;
construct, by the processor, a user profile for the user;
store, in the memory, by the processor, the user profile in association with the identifier of the user;
receive, by the processor, from the user a modification to the data management policies stored in the memory;
update, by the processor, the data management policies stored in the memory based on the modification;
receive personal data of the user collected in one or more situations by one or more collection devices;
determine whether the personal data complies with one or more of the personal data management policies;
if the personal data complies with the personal data management policies, then store in the memory the personal data in association with the identifier of the user and the policy indicating the storing of the personal data;
process the personal data according to one or more of the personal data management policies with respect to processing personal data of the user in a specific situation;
wherein to process the personal data comprises:
aggregate the personal data according to one or more of the personal data management policies,
filter the personal data according to one or more of the personal data management policies,
characterize the personal data according to one or more of the personal data management policies,
apply one or more data models to the personal data according to one or more of the personal data management policies, and
share the personal data with one or more third parties according to one or more of the personal data management policies; and
provide a centralized interface to the user for managing the personal data stored in the memory.

12. The non-transitory computer readable storage medium recited in claim 11, wherein the computer processor is further operable when executing the instructions to:
receive a modification to the personal data stored in the memory from the user; and
update the personal data stored in the memory based on the modification.

13. The non-transitory computer readable storage medium recited in claim 11, wherein the computer processor is further operable when executing the instructions to:
receive from the user a modification to the user profile stored in the memory; and
update the user profile stored in the memory based on the modification.

14. The non-transitory computer readable storage medium recited in claim 11, wherein the personal data of the user is collected by an agent residing on the collection devices.

15. The non-transitory computer readable storage medium recited in claim 11, wherein the personal data of the user comprises personal data generated by or concerning the user.

* * * * *